United States Patent [19]

Boot

[11] Patent Number: 4,957,685

[45] Date of Patent: Sep. 18, 1990

[54] METHOD OF MAKING A TRANSPORTABLE BRICK PANEL

[75] Inventor: Phillip H. Boot, Sydney, Australia

[73] Assignee: Panelbrick Industries PTY. Limited, New South Wales, Australia

[21] Appl. No.: 383,269

[22] Filed: Jul. 19, 1989

Related U.S. Application Data

[63] Continuation of Ser. No. 40,830, Apr. 21, 1987, abandoned.

[30] Foreign Application Priority Data

Apr. 23, 1986 [AU] Australia .............................. PH5586

[51] Int. Cl.[5] ...................... B29C 33/58; B29C 39/10; B29C 39/12

[52] U.S. Cl. .................................... 264/261; 264/265; 264/273; 264/277; 264/278; 264/316

[58] Field of Search ............... 264/261, 313, 316, 277, 264/278, 273, 265, 345, 245–247; 52/743, 745, 747, 259

[56] References Cited

U.S. PATENT DOCUMENTS

| | | | |
|---|---|---|---|
| 1,441,970 | 1/1923 | D'erville . | |
| 1,477,665 | 12/1923 | Richman . | |
| 1,959,816 | 5/1934 | Crum | 52/606 |
| 2,241,169 | 5/1941 | Yokes . | |
| 2,400,518 | 5/1946 | Kreber et al. | 264/316 X |
| 2,428,374 | 10/1947 | Malthouse | 52/747 |
| 2,658,379 | 11/1953 | Allen . | |
| 2,781,554 | 2/1957 | Robinson | 264/511 |
| 2,855,653 | 10/1958 | Kastenbein | 264/511 X |
| 3,204,376 | 9/1965 | Elgenstierna | 52/125.4 |
| 3,231,646 | 1/1966 | Conder et al. | 264/261 X |
| 3,359,354 | 12/1967 | Johnson | 264/511 |
| 3,640,046 | 2/1972 | Anderson et al. | 264/261 X |
| 3,641,731 | 2/1972 | Winfree | 264/261 X |
| 3,642,395 | 2/1972 | Dreher | 264/261 X |
| 3,646,715 | 3/1972 | Pope . | |
| 3,715,417 | 2/1973 | Pope | 264/261 X |
| 3,770,863 | 11/1973 | Elgenstierna | 264/261 |
| 3,936,333 | 2/1976 | Behunin | 52/747 X |
| 4,093,685 | 6/1978 | Cond | 264/316 X |
| 4,165,355 | 8/1979 | Vasilos | 264/261 X |
| 4,214,408 | 7/1980 | Rich, Jr. . | |
| 4,304,148 | 12/1981 | Hamman . | |
| 4,532,745 | 8/1985 | Kinard . | |
| 4,726,567 | 2/1988 | Greenberg | 52/169.9 X |
| 4,765,104 | 8/1988 | Boot | 52/143 |

FOREIGN PATENT DOCUMENTS

| | | | |
|---|---|---|---|
| 1567346 | 5/1980 | United Kingdom | 52/315 |
| 2089863 | 6/1982 | United Kingdom | 52/474 |

OTHER PUBLICATIONS

Engineering News-Record, May 17, 1951, pp. 28–29, vol. 146, Iss. 20, "Titt-up block walls insulate warehouse".

Random House College Dictionary Revised Edition, Random House Inc., 1980, p. 168 the Word "Brick".

Engineering News Record, May 17, 1951, pp. 28, 29, vol. 146, Issue 20 Class 52/415.

American Builder "13 Ways Premolded Membrane Gives Hidden Value Protection", May 1959, pp. 212–213.

*Primary Examiner*—Jan H. Silbaugh
*Assistant Examiner*—Karen D. Kutach
*Attorney, Agent, or Firm*—Armstrong, Nikaido, Marmelstein, Kubovcik & Murray

[57] ABSTRACT

Method for making a transportable brick panel in which a mold on which a brick panel is to be formed is set out, with the mold including a substantially flat bottom surface. A soft deformable membrane is laid over the bottom surface, with the membrance being such as to form a seal around face edges of bricks placed on it to prevent fine cementitious particles in mortar placed between the bricks from contaminating faces of the bricks. The deformable membrance is also such as to inhibit movement of bricks placed on the membrance. Courses of brickwork are arranged in the mold on the membrance, with individual bricks being substantially evenly spaced apart with spaces therebetween for receiving fluid mortar in the spaces. Reinforcing bars are arranged to pass through aligned holes in columns of bricks so as to structurally extend through the top and bottom courses of bricks. Fluid mortar is poured to fill the spaces between the individual bricks and penetrate holes in the bricks. The mortar is allowed to set and the resulting brick panel is lifted from the mold.

12 Claims, 7 Drawing Sheets

FIG. 12
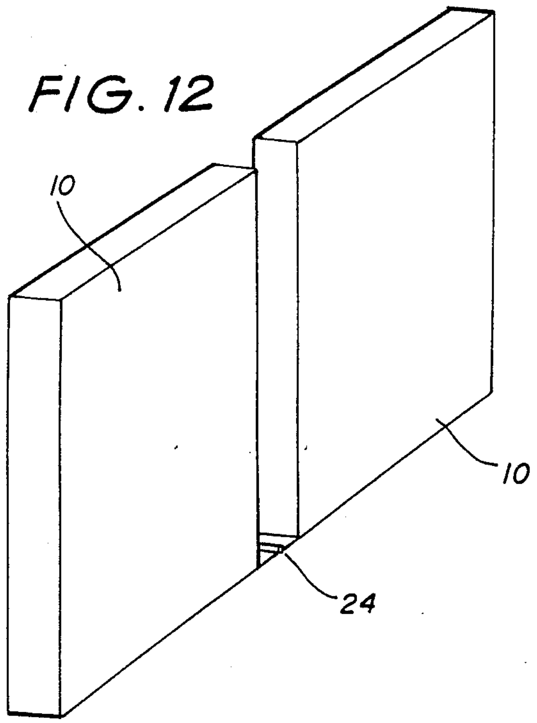
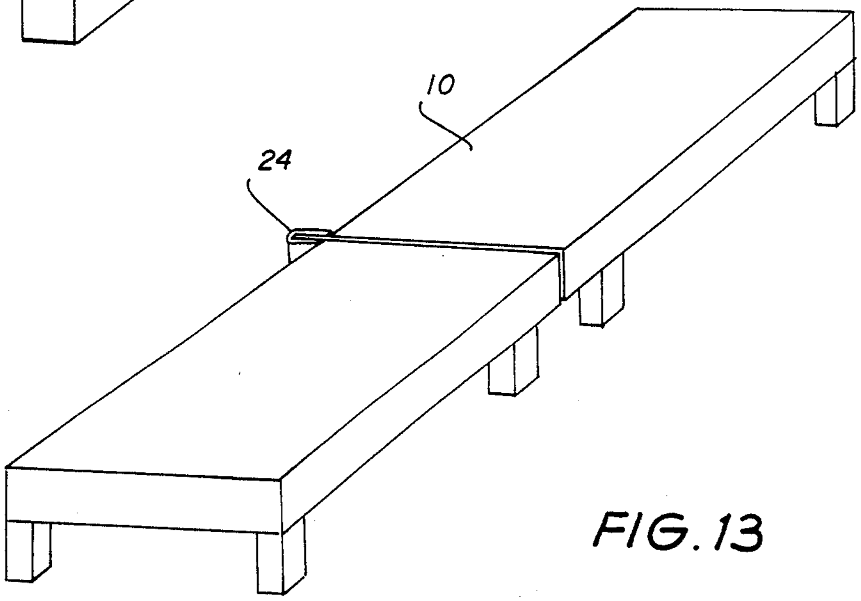
FIG. 13

METHOD OF MAKING A TRANSPORTABLE BRICK PANEL

This application is a continuation of application Ser. No. 040,830 filed Apr. 21, 1987, now abandoned.

The present invention relates to a method of manufacturing prefabricated brick wall panels.

There are many different methods of manufacturing wall panelling, and within the prefabricated building industry these methods are generally well understood. However, only partial success has been achieved in the market-place, the main reason being the high cost of aesthetically acceptable panels.

The purpose of the present invention is to provide a superior, faster, flexible and significantly more economical method of prefabricating brick panel walling suitable for single, multi-storey buildings or other suitable structures.

It is not the intention of this specification to describe different types of brick panel configurations as these will vary from project to project. It is considered that there is already adequate documentation to cover all these variations and this specification concerns itself only with a method of manufacturing a brick panel that is faster and cheaper than has been accomplished before. This method is not restricted to use with clay bricks only and is applicable to cement and silica bricks as well as clay or concrete blocks of varying sizes.

However, panels manufactured for different building types, e.g., industrial, commercial, residential, etc., sometimes require adjustments or additional techniques to the method of manufacture and these are explained below.

While variations in the method of manufacture, where high technology is used to replace some of the more labour intensive ones described in this specification, the basic concept that will enable a superior product to be ecomonically manufactured will not be altered by these variations in technique. The method is flexible enough to enable manufacture of panels up to 10 meters in height or alternatively 10 meters in length. The method is equally suitable for very low capital costing, semi-mobile manufacturing plants and very large capital intensive plants and is limited only by the market size, not by the market type.

By application of the method it is possible to make solid panels, panels with large or small openings, panels with return end projections or piers on the back, panels of varying shape suitable for detailed architectural designs or panels with dampcourse material as an integral part of the panel itself.

A great failure of the prefabrication industry is that it has not been able consistently to compete efficiently and at various levels of basic or sophisticated methodology with the conventional building methods that offer more flexibility with on-site problems and applications.

For a method to be successful it must meet the following economic criteria:

(a) A simple uncomplicated method of manufacture that can be implemented with low capital investment, speedy establishment and, if necessary, rapid relocation where production runs are very short or if the product produced becomes more detailed and custom oriented.

(b) A simple technique for the actual manufacture of the panel element themselves should be utilized, thus enabling semi- and unskilled labour to be quickly trained.

(c) It should be compatible with automated techniques that allow, where necessary, the reduction of labour content.

(d) The number of operations on site should be limited to a minimum and to allow the easy erection of the elements.

(e) It should allow elements to be included such as dampcourse, cavity ties, locating and lifting brackets, etc. and (f) Importantly it should produce a panel having the appearance of well laid brickwork free from cement contamination on its face.

The present invention consists in a method of making a transportable brick panel consisting of the following steps:

(a) Setting out a mould defining the perimeter of a brick panel to be formed, said mould including a substantially flat bottom surface;

(b) Laying of a soft deformable membrane over the said surface the membrane being such as to form a seal around the edges of bricks placed on it to prevent fine cementitious particles in mortar placed between such bricks from contaminating the faces of the bricks and such as to inhibit movement of bricks placed on it;

(c) Arranging courses of brickwork in said mould on the said membrane; individual bricks being substantially evenly spaced apart for the reception of fluid mortar in the spaces between them;

(d) Arranging reinforcing bars to pass through aligned holes in columns of bricks so as to structurally extend through to the top and bottom course or layer of bricks;

(e) Pouring fluid mortar to fill spaces between individual bricks and holes in the bricks and allowing it to set;

(f) Lifting the brick panel so formed from the mould.

It is preferred that the surface in contact with the bricks be treated with a cement release agent which may be water soluble.

It is further preferred that in some circumstances the membrane has a very thin flexible skin that combines with the membrane to further restrict the passage of fine cementitious particles. It is further preferred to arrange horizontal reinforcement in course bed joints as required.

It is also further preferred in some instances where panels require stiffer characteristics that an extra vertical layer of bricks in the form of a pier be moulded on the back of the panel. It is further preferred that when pouring fluid mortar into the spaces between the bricks constituting the brick pier, a water extraction process be used to solidify mortar and prevent the mortar from draining away from and out of the brick pier.

It is preferred, where required, that a moisture resistant dampcourse be moulded into horizontal joints between courses. It is further preferred that seals or a means of sealing be attached to the reinforcing bars where they penetrate the dampcourse to prevent the passage of moisture.

It is also preferred that the bricks be soaked in water for between 10 minutes and 60 minutes prior to panel manufacture and that their moisture content be not less than 2% by weight. It is preferred in some instances, where required, that the water be heated.

It is preferred that during brick positioning, where bricks are positioned by hand, the mould be nearly vertical but leaning slightly back and that the bricks be held vertically apart by rod spacers.

It is also preferred that in some instances the mould be split into more than one part to facilitate easier brick placing.

Where door or window openings are required suitable blockouts are introduced within the brickwork.

In order that the nature of the invention may be better understood and put into practice, preferred forms thereof are hereinafter described by way of example with reference to the accompanying drawings in which:

FIG. 12 is a perspective view of a large mould split and hinged to enable brick placing in the folded position; and FIG. 13 is a perspective view of the mould of FIG. 12 in the open position.

In the manufacture of a brick wall panel, a flat table mould 10 is required, manufactured of any suitable material such as steel or timber and of sufficient size to enable manufacture of the largest panel required.

Figure 1:
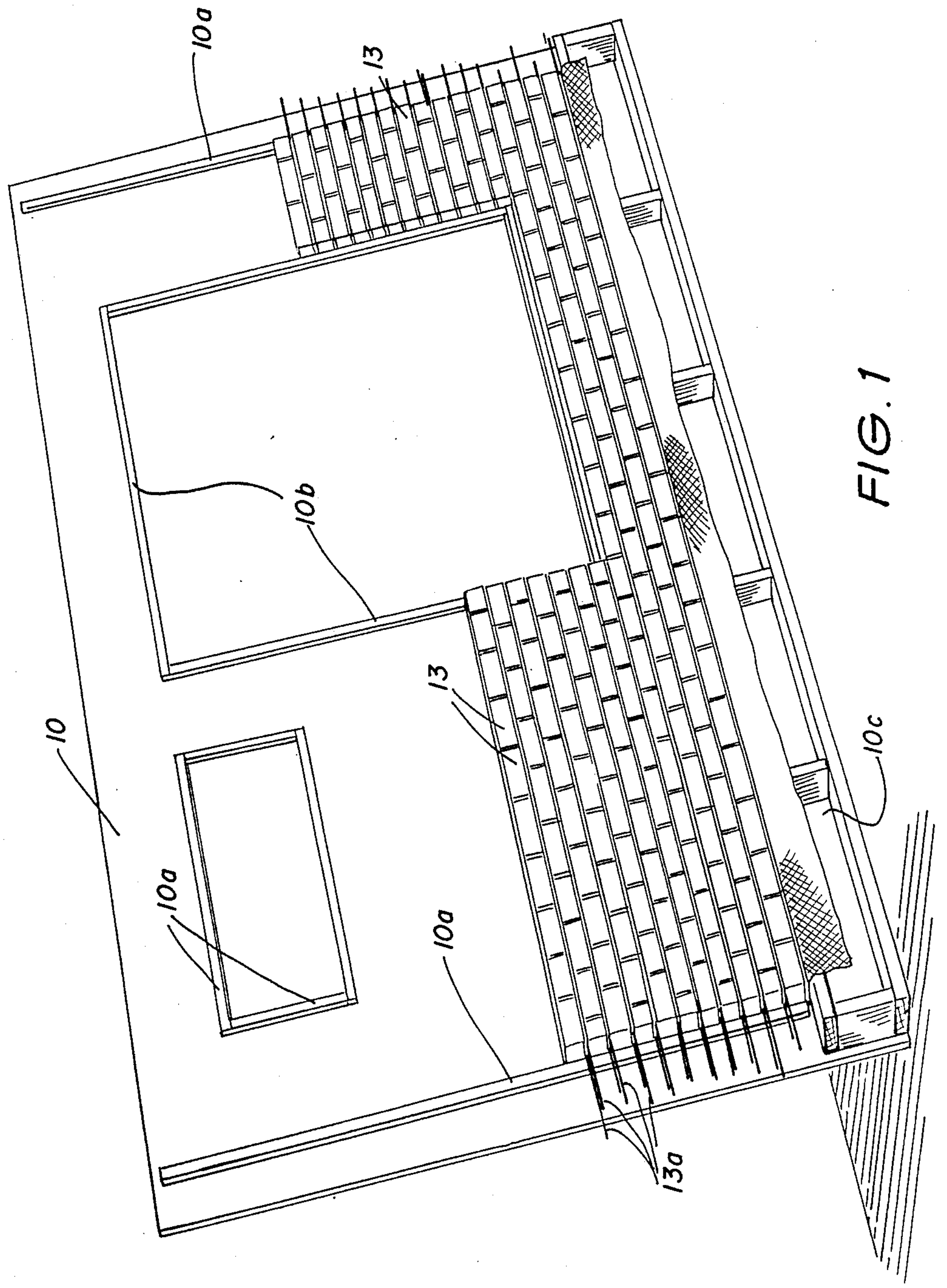
FIG. 1 is a perspective view of a brick panel according to the invention in the course of construction.

In FIG. 1 the mould 10 is shown tilted to a near vertical position for the placing of the bricks 13 of the panel by hand as described below. Initially, however, it is placed horizontally.

Figure 2:
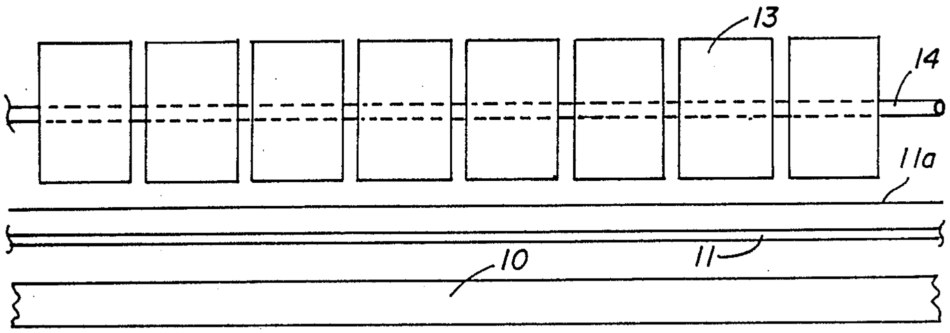
FIG. 2 is a cross-sectional view to an enlarged scale of a portion of the panel.
Figure 5:
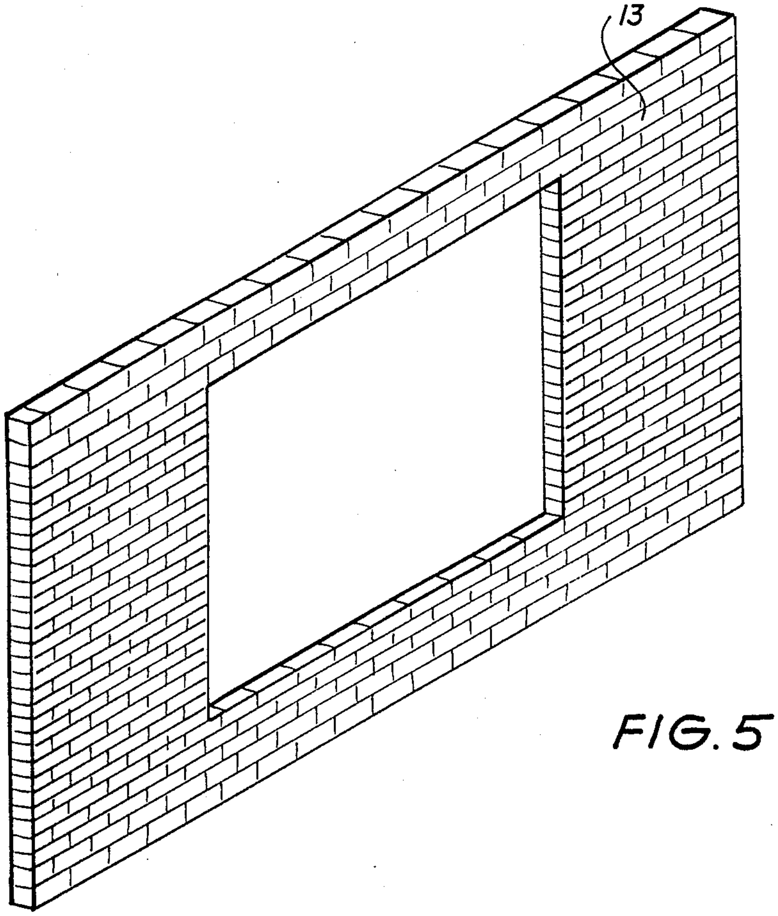
FIG. 5 is a perspective view of a typical brick panel according to the invention.

A membrane 11 and its skin 11*a* if required (see FIG. 2) is placed upon the mould surface with mould 10 in the horizontal position. The membrane 11 consists of at least a soft, deformable resilient material, e.g., a sheet of soft foam rubber or soft foam plastic for example a flexible cellular polyurethane having an interconnected cell structure of approximately 4 mm thickness.

It is preferred that the membrane be stabilized either by attaching to the mould surface or by a skin on at least one of its surfaces which, depending on its type, may be bonded or attached to the membrane. However, if on the upper surface it must have the ability to deform in a co-operative manner similar and imitative of the membrane sufficiently so that under the weight of individual bricks it will assume or maintain the contours and surface irregularities of each brick so as to form a satisfactory seal around each brick to prevent the passage of fine cementitious particles onto the brick face, e.g., a very thin film of flexible plastic attached to the upper surface of the membrane or preferably a porous absorbent fibrous material that will assist the membrane, e.g., a sheet of paper of approximate newsprint grade or an application of wood pulp solution. The contamination of the overall surface areas of the brick faces is prevented by the sealing of the brick edges by the deformable membrane.

It is also preferred that the-surface of the membrane or its skin which is in contact with the brick faces be treated with cement retardant preparation or suitable release agent which preferably would be water soluble.

The configuration of the brick panel is set out and defined on its vertical edges by sub-edgeboards 10*a*. These are fixed in position on the mould 10 as shown in FIG. 1.

A blockout 10*c* is included where a dampcourse and brick courses beneath it are to be incorporated in the brick panel.

The mould is then raised to a substantially vertical position as shown in FIG. 1, at least within 1° to 15° of vertical so that the bricks 13 rest against the mould. The bricks 13 are then placed face against the membrane 11 and skin 11*a* (if required) and spaced apart with round rods 13*a* laid horizontally between each layer of bricks until all the bricks in the panel are in position.

Vertical joints are gauged by eye only and obviously are related to bond and window/door positioning. Window and door openings are positioned prior to positioning the bricks 13 and are in the form of sub-edgeboards 10*b*, the sub-edgeboards being approximately 10 mm in depth thus ensuring a proper dimensional blockout for installation of the actual window or door frames. The mould 10 is then lowered back to an approximately horizontal position.

Reinforcing bars 14 are inserted from the top of the panel through the holes in the bricks until they pass through to what, when the mould was in a near vertical position, was the bottom layer of the bricks. These bars 14 could in some instances be inserted from either end of the panel. In fact, they need not be the same height as the panel. However, any discontinuity of the bar or bars 14 would have to be designed so that when inserted from either the "top" or the "bottom" they lap each other enough (in length) so as to structurally join the panel after curing.

Figure 7:
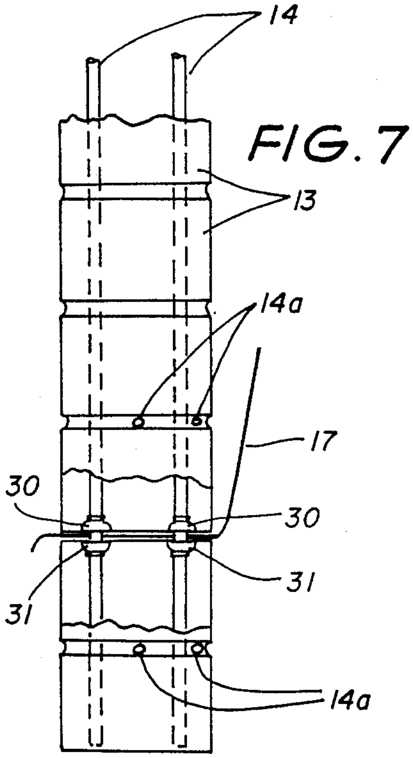
FIG. 7 is a part-sectional end elevation of a portion of a panel illustrating the location of a dampcourse and seals.

Horizontal reinforcing bars 14A are placed as required in the horizontal bed joints, i.e., between the courses or layers of bricks as shown in FIG. 7.

Figure 3:
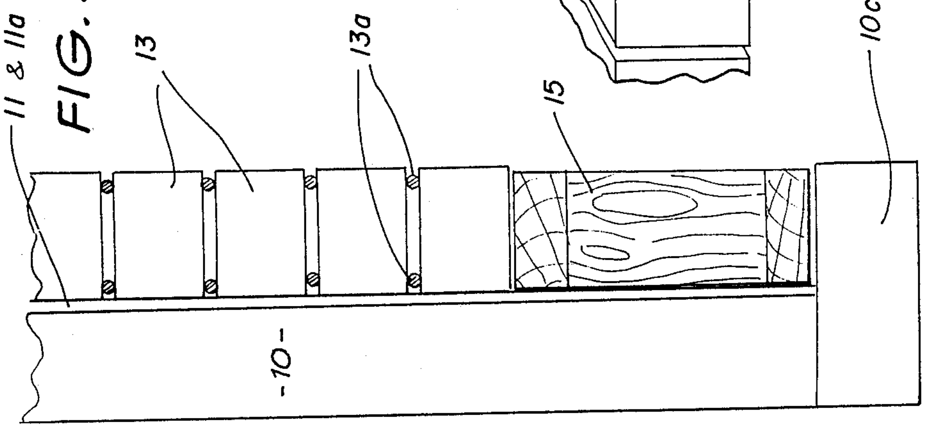
FIG. 3 is an end elevation of the lower part of the panel under construction.
Figure 6:
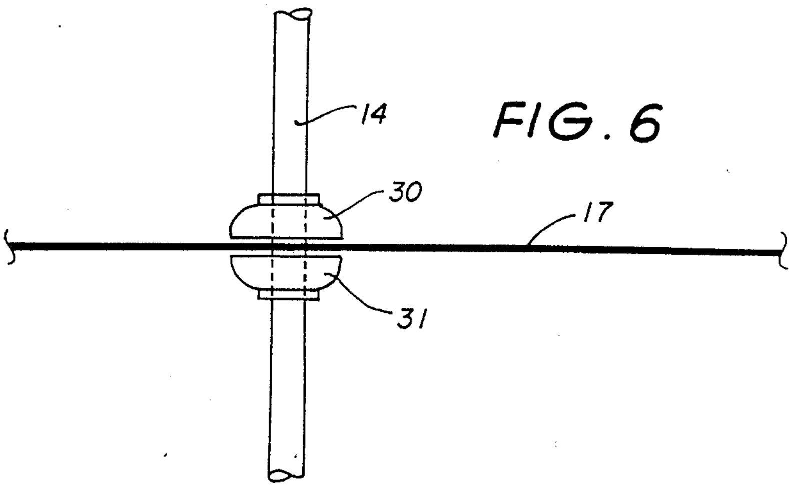
FIG. 6 is a detail showing the arrangement of the dampcourse seals on a reinforcing bar.

If a dampcourse is required the following procedure is followed:

A dampcourse upper seal 30 (see FIGS. 6 and 7) is attached to the bars 14 and then the bars are passed through the now positioned dampcourse 17 (bottom course 15 only - FIG. 3) whereupon the dampcourse lower seal 31 is attached, thus effectively sandwiching the dampcourse 17 between the two seals. If the reinforcing 14 is inserted from the bottom then the sequence of attachment of the upper and lower seals 30 and 31 is reversed.

Figure 8:
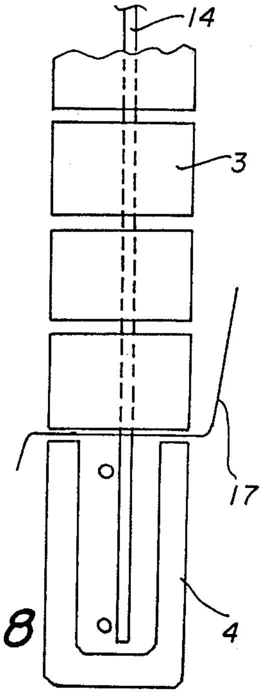
FIG. 8 is a part-sectional end elevation of a portion of a panel illustrating a precast concrete bottom beam with dampcourse.

Further layers or courses of bricks or precast/in situ reinforced concrete beams (see FIG. 8) or both can then be added to the bottom, i.e., below the dampcourse if required. Bars 14 are then extended into these lower courses or beams.

The reinforcing bars 14 are usually under 12 mm in diameter and preferably treated to resist corrosion, e.g., by galvanizing or epoxy coating. This reinforcing varies in size and quantity according to the structural and handling requirements. Reinforcing bars can be located through any of the preformed core holes in the brick and sometimes, depending on diameter, also passing through vertical joints between the bricks. The round rods 13*a* are now withdrawn and any further horizontal reinforcing 14*a* required can be placed in position.

Edgeboards (not shown) for the brickwork are now placed in position on the mould 10, preferably with a porous material, e.g. paper, separating the brick end/-faces from the edgeboard. When this is complete weepholes if required are blocked out with packing material, e.g., polystyrene, in some of the vertical joints directly above the dampcourse 17.

Figure 4:
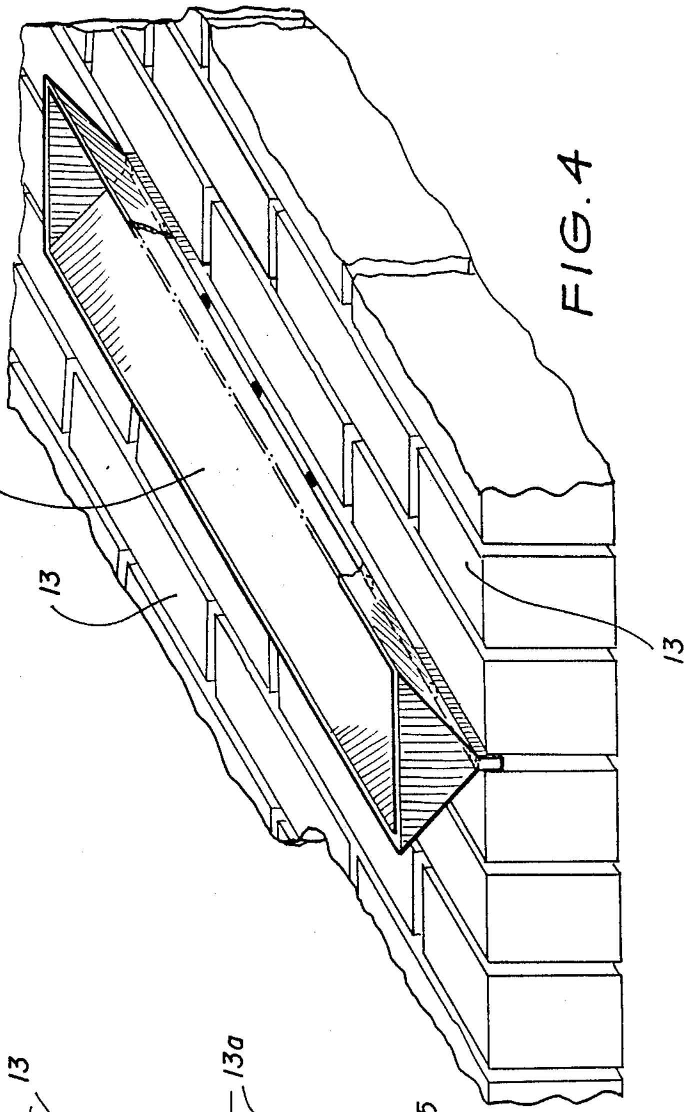
FIG. 4 is a perspective view illustrating the step of introducing mortar into the joints between the bricks.

Because it is important to introduce the liquid mortar directly into the joints between the bricks 13 (the reason for this is so as to generate a cross flow effect when mortar filling, causing air pockets trapped in all the many holes, etc., to be evacuated more efficiently) mortar troughs 19 are placed at various horizontal joint intervals (as shown in FIG. 4) so as to facilitate fast and clean introduction of the mortar into the brick joints.

This "cross flow" effect achieved when pouring the fluid mortar is advantageous as it allows full penetration of all the brick core holes as well as the joints between bricks, making a completely solid panel. The mortar therefore fully embeds all the reinforcing and allows the panel as a whole to perform similarly to reinforced concrete, the bricks acting like huge pieces of aggregate separating the mortar. Structurally this produces a product that performs in a semi-elastic manner to recover deformations under superimposed loadings. It should be pointed out that this is not normal behaviour for brickwork which is structurally erratic and establishes a structural design criterion for single leaf brickwork that only reinforced concrete has enjoyed before.

This structural effect was confirmed during comprehensive flexural testing of reinforced and unreinforced brick panels. These tests showed reliably similar deformation and recovery performances to reinforced concrete.

The main criterion for the "cross flow" effect to work is the flowability of the fluid mortar. However, the effect of dry porous bricks on the mortar during this operation can be very detrimental. It was realized that in order to prevent the bricks from "soaking up" the free water needed for fluidity in the mortar, the bricks 13 needed to be soaked or saturated. The required quantity of moisture in the bricks 13 at the mortar pouring sequence is gained after immersion in water for between 10 and 60 minutes. A brick that has a total absorption of approximately 8% by weight of dry brick if immersed in water will absorb approximately 4.5% in 10 minutes and approximately 6% in 60 minutes. The bricks 13 should have a moisture content of at least 2% of their total dry weight to ensure that the mortar will flow adequately. It should be noted that this is the water content at the time of introducing the mortar into the bricks.

In very cold climates where the bricks, as delivered, are too cold to allow the normal hydration of the cement content in the mortar, thus slowing the production cycle, it was found that by immersing the bricks in boiling water the temperature of the brick reached 100° C. in only 15 to 20 minutes, depending on the ambient brick temperature.

The optimum temperature to have the brick during the mortar phase of panel production is approximately 35° C., as this significantly decreases the time required to obtain initial and final set of the mortar.

It is well established that when curing fresh concrete or mortar, elevated curing temperature can only be obtained at an acceleration rate of approximately 15° to 20° per hour after final set has taken place. The effect of this brick heating method to improve stripping cycle times is significant. The insulative quality of the clay brick acts as a "heat bank" thus warming the mortar (not above 35° C.), decreasing the final set period and allowing accelerated heat during cycle of the panel to commence earlier and at a higher temperature, resulting in a shorter overall curing cycle.

The mortar mix must be very liquid and pour readily, for example 675 gms of mix should run easily through a 14 mm hole in a funnel within eight seconds, preferably 4 to 6 seconds. This fluidity is preferably achieved by the use of water reducing super- plasticizers. The dimensions of this funnel are: the upper cone shape is 90 mm high and tapers from 115 mm diameter at the top to 20 mm diameter at the bottom. The spout is 30 mm long and tapers from 20 mm diameter at the bottom of the cone to 14 mm diameter at the outlet.

When this is complete the panel is cured sufficiently before tilting vertically and separating from the mould. This is therefore the reason to treat the upper membrane surface or skin with a cement retardant or release agent, thus enabling the skin 11*a* if used, which will adhere to the brick panel, to be peeled away and the brickwork then brushed or washed and any blemishes rectified. If required an extra heavy coating of the water soluble cement retardant can be used and after the membrane 11 or skin 11*a* is removed the mortar joint can be washed away so as to be recessed and have the bricks 13 standing out and proud if required.

The basic function of the membrane is to prevent fine cementitious particles contained in the mortar from contaminating the brick face, additionally the membrane is used to stabilise the brick in its preferred position during the preparation and process of manufacture. A typical membrane would be a soft deformable, flexible material e.g. a sheet of foam plastic, foam rubber or a soft deformable fibrous material e.g. a multi layer of paper with a corrugated core or a sheet of synthetic or natural fibrous matrix for example woven or non-woven fabrics such as interfacing used in the clothing industry or hair felt.

The membrane can be if preferred or required assisted in its functions by the addition of a "skin". This skin can take two basic forms, a very thin plastic film attached or bonded to the membrane, or a sheet or layer of porous fibrous material e.g. a sheet of paper. The skin, however, should generally imitate or reproduce the desired membrane qualities.

The membrane and its skin, if required, have to perform to a large variety of changeable parameters and in some cases its specifications need to be altered to suit these different parameters. The most common variables are:

(a) Bricks that vary in weight, density, mass, size, surface irregularities, roughness and shape.

(b) Mortar that is varied by its own constituents i.e. water, aggregate, cement, lime, fly ash, chemical additives e.g. superplasticisers, retarders etc. and any extremely fine particles e.g. silica fume.

(c) The cost and availability of the membrane's own elements at the geographical point of manufacture.

Obviously when the bricks being used have large or deep irregularities or roughness the membrane needs to deform to a larger degree than if the bricks were flat and smooth, particularly around the perimeter of its face. If the bricks are lighter for example the membrane has to be softer or if the mortar mix has very fine particles in it or the membrane is of a coarse type then the membrane may need the use of a skin on its upper surface. As stated previously it is preferred that the membrane stabilise the brick and therefor it is preferred that the membrane be stabilised. This is achieved by two basic methods.

1. Attaching, bonding or adhering the membrane to the mould surface.
2. Combining the membrane with a skin.

If this skin is between the membrane and the mould surface then it should attach or adhere to the membrane.

Alternatively it can be positioned between the bricks and the membrane and in this situation can be either attached or unattached to the membrane as it acts as an interface preventing the sometimes coarse, rough or abrasive brick surface from destabilising or otherwise detrimentarily interfering with the membrane during either the brick placing or other operations. In this position, however, the skin can perform another and generally more important function, it can be used to restrict the passage of fine cementitious mortar particles from penetrating into the membrane as this not only contaminates the membrane but can allow in some circumstances, these particles to migrate through the membrane and around onto the face surface of the bricks e.g. when a very thin or coarse open membrane is used. The skin does not necessarily need to be porous or non-porous as both can be made to combine and compensate where necessary with the various qualities of different membranes to work very well, however, the roughness and abrasiveness of the brick causes the substantially non-porous thin plastic film type to suffer damage, also if re-usage is contemplated it also needs to be cleaned. The porous type of skin is less expensive and is easily disposed whilst keeping the membrane clean and protected, allowing more re-usage. This type of skin could also be varied in form e.g. instead of a sheet of paper it could be sprayed or applied onto the membrane in the form of a mixture of wood or paper pulp blended with a cement retardant.

The qualities of the membrane may be altered or varied to suit different conditions, e.g. thickness, softness, deformability, cell or fibre structure, density or hardness and resiliency.

The membrane works in the following manner, it is placed or can be applied onto the mould surface with or without a "skin" as required then bricks are placed on the membrane spaced apart for joints in their designated positions. The weight of the brick acting on the membrane causes a highly localised pressure under the edge of the brick.

Pressure from this applied load will force the soft membrane material downwards. If the membrane is of a plastic foam type the cells distort and collapse by degrees in a progressive manner commencing on the upper surface directly under the applied load, the cellular structure deforms as the air is expelled taking up new shapes as dictated by the surface of the load. Beyond the edge of the bricks there is a sudden release of pressure, causing large deformation in the membrane, the elastomeric cellular structure in a "hinge" like action rotates around the brick edge thus effecting a seal. When an upper skin is used this action is slightly inhibited, making the choice of compatibility of skin and membrane important.

A fibrous matrix material performs in a similar manner except that it relies on the resistance of the fibre and its arrangement instead of the elastomeric qualities of the cellular walls. In the case of using corrugated paper, it is the arrangement of fibres that give its resistance to the weight. The applied load distorts the corrugated section and expels air similar to a cellular type structure. The upper surface at least must be very soft preferably wet so that between the applied load and the resistance of the fibres and or fibrous structure, it reproduces the brick shape and seals around its perimeter. Corrugated paper or cardboard could be made up of various layers the simplest being an upper flat sheet supported by another layer which in section is arranged in a corrugated configuration. Other types of fibrous or cellular materials could be used with or without skins depending on their coarseness or porosity as long as the brick can maintain sufficient deformation around its perimeter to form a satisfactory seal as well as being sufficiently stable.

Even though the mortar used sometimes is of a higher density than the bricks it will not reverse the deformative action of the membrane around the perimeter of the brick edge. This deformation can be increased if necessary by exerting additional temporary loads on the bricks e.g. pushing down or walking over them, the dead weight of the brick will hold the membrane down in a lower position depending on the qualities of the membrane. Bricks during testing exerted a dead weight of 14 kg–18 kg/m$^2$ per 10 mm of thickness e.g. a 110 mm thick brick would exert a load range of 154 kgs–198 kgs on the membrane depending on its type. The membrane thickness ranged from 2 mm–10 mm thick and foam core density from 15 kgs–25 kgs/m$^3$.

Resilience ranged from very low values for corrugated cardboard to 45% for some foams. All the membranes or skins need to be treated with a cement retardant or suitable release agent if left in the mould to cure. The release agent must be compatible with the bricks so that any absorption will not harm them, for this reason water soluble types are preferred.

The foregoing description is of a typical application of the invention and does not cover every situation. The development of the panel itself has dictated that in the various forms that the panel could take, the manufacturing process has to adjust and in some situations change.

Figure 10:
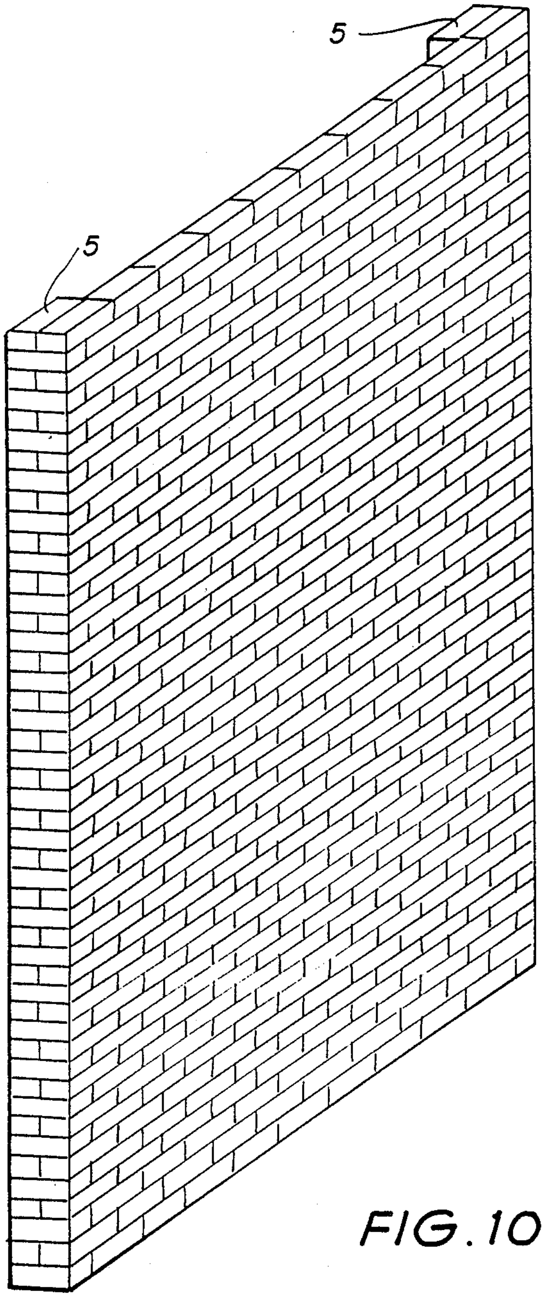
FIG. 10 is a perspective view of a large solid panel with brick piers on the back.

For example, when manufacturing very large industrial panels, i.e., up to 8 meters in height and 3 meters in width (see FIG. 10) it became impossible due to height restrictions to stand the mould up to the near vertical position so as to have the bricks 13 placed in it. The solution came by splitting the mould 10 in half (see FIGS. 12 and 13), i.e., two parts each 4 meters high and 3 meters wide. Sometimes the two halves can be hinged 24 so that when full of bricks and lowered back into the horizontal position the mould is "hinged" 24 closed and bolted together back into its 8 M and 3 M configuration. This simple technique enables large panels to be manufactured using this method.

Another variation in producing a very large panel described above is that structurally it is required to be stiffer than a smaller height panel if it is to perform structurally up to 8 meters in height and still be manufactured from standard thickness bricks (110 mm). This calls for thickenings or piers moulded onto the back of the panel (see FIG. 10). In order to maintain structural stability in use, the piers 5 are manufactured from bricks 13 so as to be compatible with the rest of the panel.

The brick "piers" are placed into the mould using the same method as the rest of the bricks 13. Indeed they are formed at the same time as the panels are formed, layer by layer at the same time. Small spacers 6 (FIG. 9) are placed between the panel bricks and the pier bricks so as to facilitate mortar flow and subsequent bonding between the two bricks. These spacers are left in position and become part of the panel itself. However, they perform no structural function.

Figure 9:
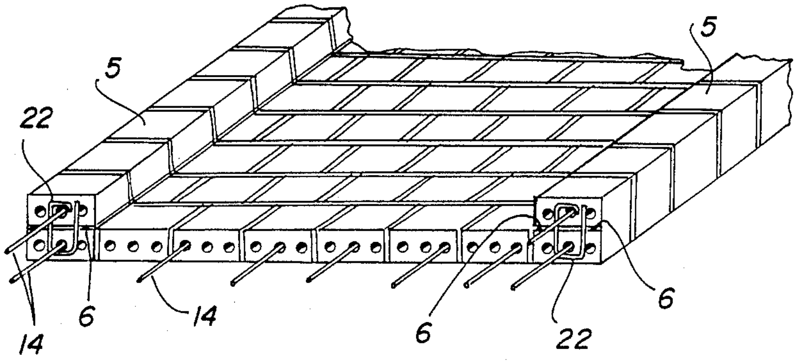
FIG. 9 is a perspective view of a typical reinforcing detail for a brick panel wall without openings.
Figure 11:
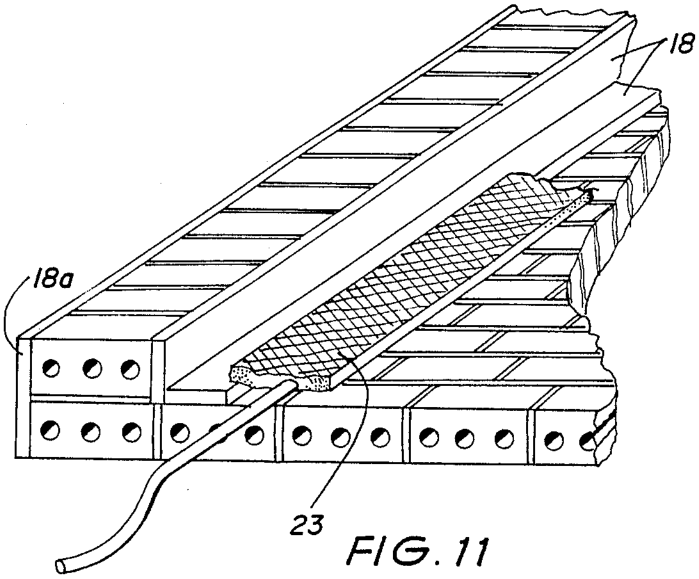
FIG. 11 is a perspective view of the dewatering process when moulding brick piers on the back of a panel.

Steel reinforcing stirrups 22 (FIG. 9) or ties are also placed during the reinforcing stage so as to tie the vertical reinforcing in the piers 5 to the vertical reinforcing 14 in the panels (see FIG. 9).

It is however in the mortar placing phase that problems occur with the pier 5 (FIGS. 10 to 13). As the mortar is very fluid and mobile it will not stay up between the pier bricks and leaks out at the base of the pier edgeboards 18 (FIG. 11) adjacent to the back of the panel, flooding onto the back of the panel itself. It was found necessary to dewater at the edge of the pier 5 (FIG. 11) adjacent to the panel so that the fresh mortar "leaking out" of the pier formation solidifies and becomes immobile, thus allowing the pier 5 to be filled with fresh mortar.

The dewatering process may be effected by means of a vacuum pump through a filtered vacuum chamber. However, any other method of separating the "free water" from the mix, e.g., thick highly absorbent filter papers, could be used.

The vacuum chamber could be installed continuously within the pier edgeboard configuration if desired or alternatively be an independent semi-flexible "pad" 23 (FIG. 11) that is moved along as the pier mortar filling progresses. Vacuum pressures do not have to be high, e.g., 380 mm to 600 mm Hg.

This technique of moulding piers 5 onto the back of panels would become almost mandatory where, as in some countries, the typical face brick thickness (panel thickness) is less than 100 mm, causing slenderness problems with the panel and affecting its structural performance. Additionally, when it is required to manufacture panels with return ribs or walls of greater than one thickness, this technique could be used for "L" shaped walls.

The manufacturing method of the panel itself can be altered to suit automated techniques, particularly in the area of brick placing. In order to eliminate the labour necessary in brick placing, programmable mechanical concepts such as robotics or indexing machinery could be deployed to carry out this task. Obviously, productivity would be related to capital and labour costs. However, the effect of this approach on the process outlined in this document affects only one substantial phase of the production cycle, i.e., the method of placing of the bricks in the mould.

In an automated process the bricks need not be handled by manual labour. This negates the necessity to stand the mould vertically during this operation, as a mechanical device would not have the same restrictions as a human being.

In this case the mould would remain in the horizontal position and the bricks would be placed by mechanical means on the membrane, whose role would be unaltered. The resultant panel produced would be in appearance no different. The only variation would be the costs and cost savings associated with the changed methodology and the greatly increased capital expenditure.

I claim:

1. A method of making a transportable brick panel, said method comprising the steps of:

setting out a mold on which a brick panel is to be formed, said mold including a substantially flat bottom surface;

laying a soft deformable membrane, for preventing contamination by particles of the overall surface areas of rough-surfaced brick faces, over said bottom surface, wherein said membrane restricts particles from passing therethrough and being such as to form a seal around face edges of bricks placed on said membrane to thereby prevent fine cementitious particles in mortar placed between said bricks from contaminating said overall surface areas of said rough-surfaced faces of said bricks and to thereby inhibit movement of bricks placed on said membrane;

arranging courses of brickwork in said mold on said membrane to have the weights of said bricks supported by said soft deformable membrane so that portions of said brick faces in contact with said membrane exert pressure on said membrane to thereby cause a deformation in deform said membrane due to a sudden release of pressure beyond the edges of said bricks, said deformed membrane rotating around said edges of said bricks in a hinge action so as to stabilize said bricks relative to said mold and to seal the face edges of said bricks with said deformed membrane, individual bricks being substantially evenly spaced apart with spaces between them for receiving liquid mortar in said spaces;

arranging reinforcing bars to pass through aligned holes in columns of said bricks so as to structurally extend through to the top and bottom courses of said bricks;

pouring liquid mortar to fill said spaces between said individual bricks and penetrate holes in said bricks;

allowing said mortar to set thereby forming said brick panel; and lifting said brick panel so formed from said mold.

2. A method as claimed in claim 1, wherein prior to arranging courses of brickwork in said mold, said mold is raised from a substantially horizontal position to a position in which said bottom surface is at an angle of between 1° and 15° of vertical and said bricks are placed by hand, each course of brickwork being separated from courses above and below by spacer members.

3. A method as claimed in claim 1, wherein said courses of brickwork are arranged in said mold with said bottom surface of said mold in a substantially horizontal position, individual bricks being placed in said mold by machine.

4. A method as claimed in claim 1, wherein a sheet of thin flexible material is placed on said membrane.

5. A method as claimed in claim 4, wherein said sheet is treated with a soluble cement retardant preparation.

6. A method as claimed in claim 4 or 5, wherein said sheet is of absorbent paper for conforming with the contours and surface irregularities of each brick so as to form a satisfactory seal thereto.

7. A method as claimed in claim 1, wherein said membrane is of foam material.

8. A method as claimed in claim 7, wherein said foam material has a skin on one face.

9. A method as claimed in claim 1, wherein said liquid mortar is introduced directly into said spaces between said bricks by means of mortar troughs, said mortar being sufficiently liquid to fill said holes in said individual bricks through which said reinforcing bars pass.

10. A method as claimed in claim 1, wherein said individual bricks are soaked in water before being placed in said mold.

11. A method as claimed in claim 1, wherein said individual bricks are heated before being placed in said mold.

12. A method as claimed in claim 1, wherein additional bricks are added over said courses of brickwork to form at least one pier on said panel, reinforcing bars are passed through said additional bricks and, during pouring of said liquid mortar, dewatering of mortar poured between bricks adjacent those forming said pier is carried out to prevent outflow of mortar from between said bricks constituting said pier.

* * * * *